(12) United States Patent
Rothman et al.

(10) Patent No.: US 7,543,048 B2
(45) Date of Patent: Jun. 2, 2009

(54) METHODS AND APPARATUS FOR ENABLING OF A REMOTE MANAGEMENT AGENT INDEPENDENT OF AN OPERATING SYSTEM

(75) Inventors: Michael A. Rothman, Gig Harbor, WA (US); Vincent J. Zimmer, Federal Way, WA (US); Mark S. Doran, Olympia, WA (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 10/302,281

(22) Filed: Nov. 22, 2002

(65) Prior Publication Data

US 2004/0103175 A1  May 27, 2004

(51) Int. Cl.
G06F 15/177 (2006.01)
G06F 15/173 (2006.01)
G06F 9/00 (2006.01)
G06F 9/24 (2006.01)

(52) U.S. Cl. .................. 709/222; 709/220; 709/223; 709/224; 713/1; 713/2

(58) Field of Classification Search .............. 709/220, 709/222–224, 250
See application file for complete search history.

(56) References Cited

U.S. PATENT DOCUMENTS

| | | | | |
|---|---|---|---|---|
| 5,577,210 A | * | 11/1996 | Abdous et al. | 709/219 |
| 5,680,547 A | * | 10/1997 | Chang | 709/222 |
| 6,272,629 B1 | * | 8/2001 | Stewart | 709/222 |
| 6,324,644 B1 | * | 11/2001 | Rakavy et al. | 713/1 |
| 6,327,660 B1 | | 12/2001 | Patel | |
| 6,385,211 B1 | | 5/2002 | Williams et al. | |
| 6,421,777 B1 | * | 7/2002 | Pierre-Louis et al. | 713/2 |
| 6,532,537 B1 | * | 3/2003 | Chen et al. | 713/2 |
| 6,609,151 B1 | * | 8/2003 | Khanna et al. | 709/222 |
| 6,639,693 B1 | * | 10/2003 | Ejiri et al. | 358/434 |
| 6,684,327 B1 | * | 1/2004 | Anand et al. | 713/2 |
| 6,732,067 B1 | * | 5/2004 | Powderly | 703/24 |
| 6,732,267 B1 | * | 5/2004 | Wu et al. | 713/2 |
| 6,810,478 B1 | * | 10/2004 | Anand et al. | 713/2 |
| 6,816,964 B1 | * | 11/2004 | Suzuki et al. | 713/2 |
| 6,965,927 B1 | * | 11/2005 | Takokoro et al. | 709/220 |
| 6,986,033 B2 | * | 1/2006 | Miyamoto et al. | 713/1 |
| 7,069,428 B2 | * | 6/2006 | Miyamoto et al. | 713/1 |
| 7,225,245 B2 | * | 5/2007 | Gurumoorthy et al. | 713/2 |

(Continued)

*Primary Examiner*—Hassan Phillips
(74) *Attorney, Agent, or Firm*—Marshall, Gerstein & Borun LLP

(57) ABSTRACT

Methods and apparatus for remotely managing a computer are disclosed. For example, a remote management agent is provided for use in a computer having a processor. The example remote management agent includes a communication agent in communication with the controller to contact a server before an operating system is loaded on the computer to obtain an initialization packet from a server and an initialization packet loader in communication with the controller to load the initialization packet in a protected memory area of the computer, before the operating system is loaded.

The remote management agent also includes a monitoring agent, not associated with the operating system, in communication with the controller to monitor the computer for a communication from the server and a command line interface agent, also not associated with the operating system and in communication with the controller to interpret and respond to the communication from the server.

45 Claims, 7 Drawing Sheets

U.S. PATENT DOCUMENTS

2002/0133575 A1* 9/2002 Cidon et al. ................ 709/220
2003/0018763 A1* 1/2003 Doherty et al. ............. 709/223
2003/0229694 A1* 12/2003 Tsai et al. ................... 709/224
2004/0010627 A1* 1/2004 Ellis et al. ................... 709/250

* cited by examiner

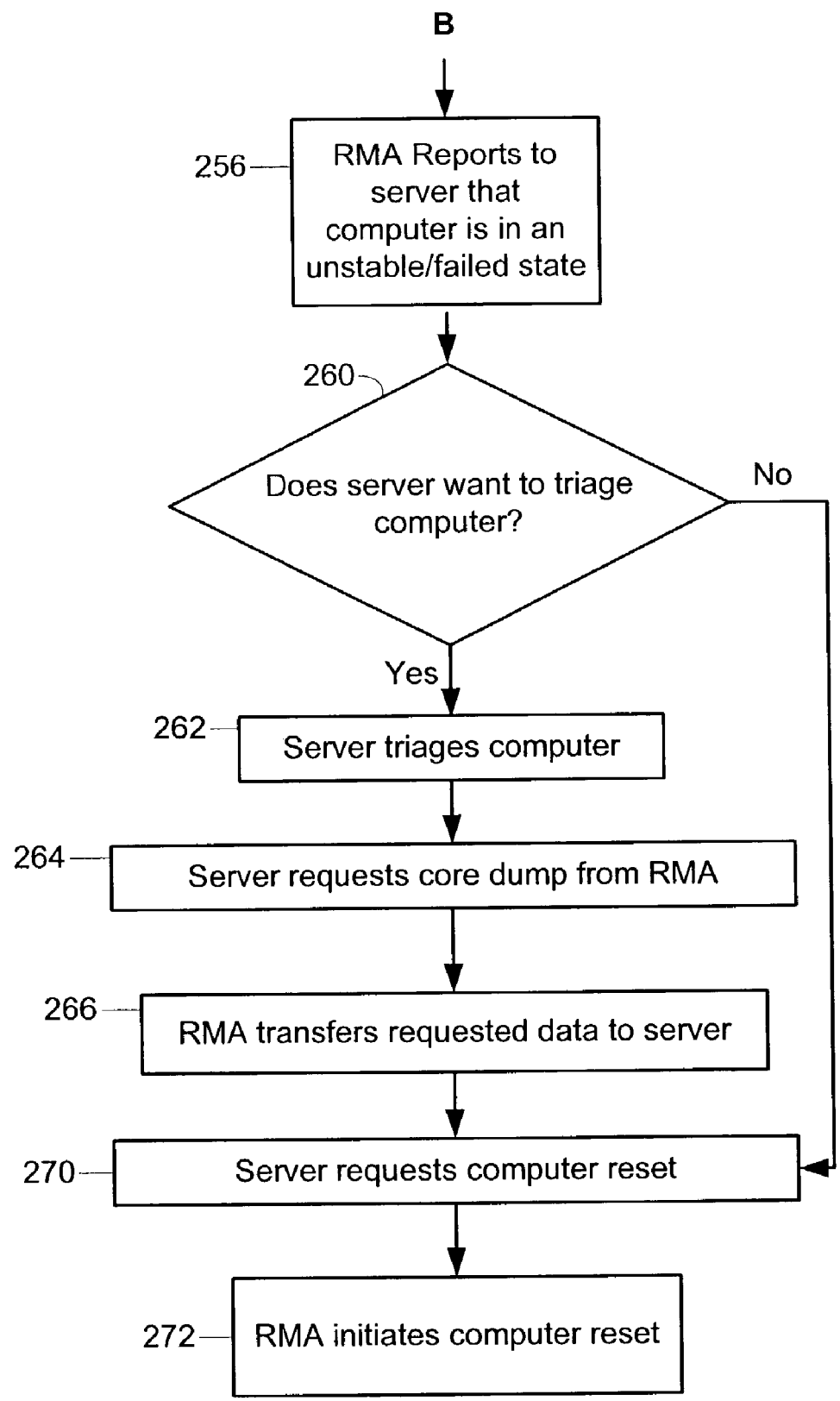

METHODS AND APPARATUS FOR ENABLING OF A REMOTE MANAGEMENT AGENT INDEPENDENT OF AN OPERATING SYSTEM

FIELD OF THE DISCLOSURE

The patent relates generally to remote management of a computer, and more particularly, to methods and apparatus for remotely managing a computer independent of an operating system.

BACKGROUND

The boot environment for computers presents significant challenges to innovation within the hardware and software industries. Each new platform capability or hardware innovation requires firmware developers to craft increasingly complex solutions, and often requires Operating System (OS) developers to make changes to their boot code before customers can benefit from the innovation. This can be a time-consuming process requiring a significant investment of resources. The hardware and software industries have attempted to allow the platform and OS to evolve and innovate independently of one another.

To permit such independent innovation and maintain necessary communication between an OS and platform firmware (any software that is included in read-only memory (ROM)), an interface having an additional layer of firmware code provides for the abstraction of the OS and all higher level software from the firmware. The interface operates in what is referred to as a pre-boot environment as well as providing some additional run-time capabilities. Previous attempts to develop such an interface have required the OS to have specific knowledge of the workings of certain hardware devices. Previous attempts at developing the interface were not effective and did not allow for the dynamic management of those devices in the pre-boot environment and in some run-time environments.

Specifically, configuring, monitoring and debugging conventional computers and/or machines have required a physical presence of an administrator to perform these tasks. Some of these tasks have also required additional hardware to be operatively connected to the computer before the tasks can be performed. Furthermore, conventional computers have been limited in what information they can provide to a remote administrator and in what tasks can be initiated remotely. Most conventional computers have required the assistance of a loaded and functional operating system to communicate and cooperate with a remote administrator. All classes of computers, including enterprise class system, can benefit from remote configuration management, but the benefit becomes much more pronounced when systems both large and small are considered that have multiple computers located in multiple physical locations, all connected to a network that allows access by a single remote administrator.

BRIEF DESCRIPTION OF THE DRAWINGS

FIGS. 5A-C are parts of a flowchart illustrating some events to remotely manage a computer independent of an operating system.

DESCRIPTION OF VARIOUS EMBODIMENTS

The present patent describes methods and an apparatus to enable a remote management agent for a machine (i.e., computer) independent of an operating system. If the machine is connected to a network and provided access to a server (i.e. a remote administrator), the server may transfer an initialization packet to the machine which may be loaded in a protected memory portion of the machine and used in conjunction with a firmware interface such as an Extensible Firmware Interface (EFI) to allow a variety of tasks to be performed remotely by the server, independent of an operating system.

Figure 1:
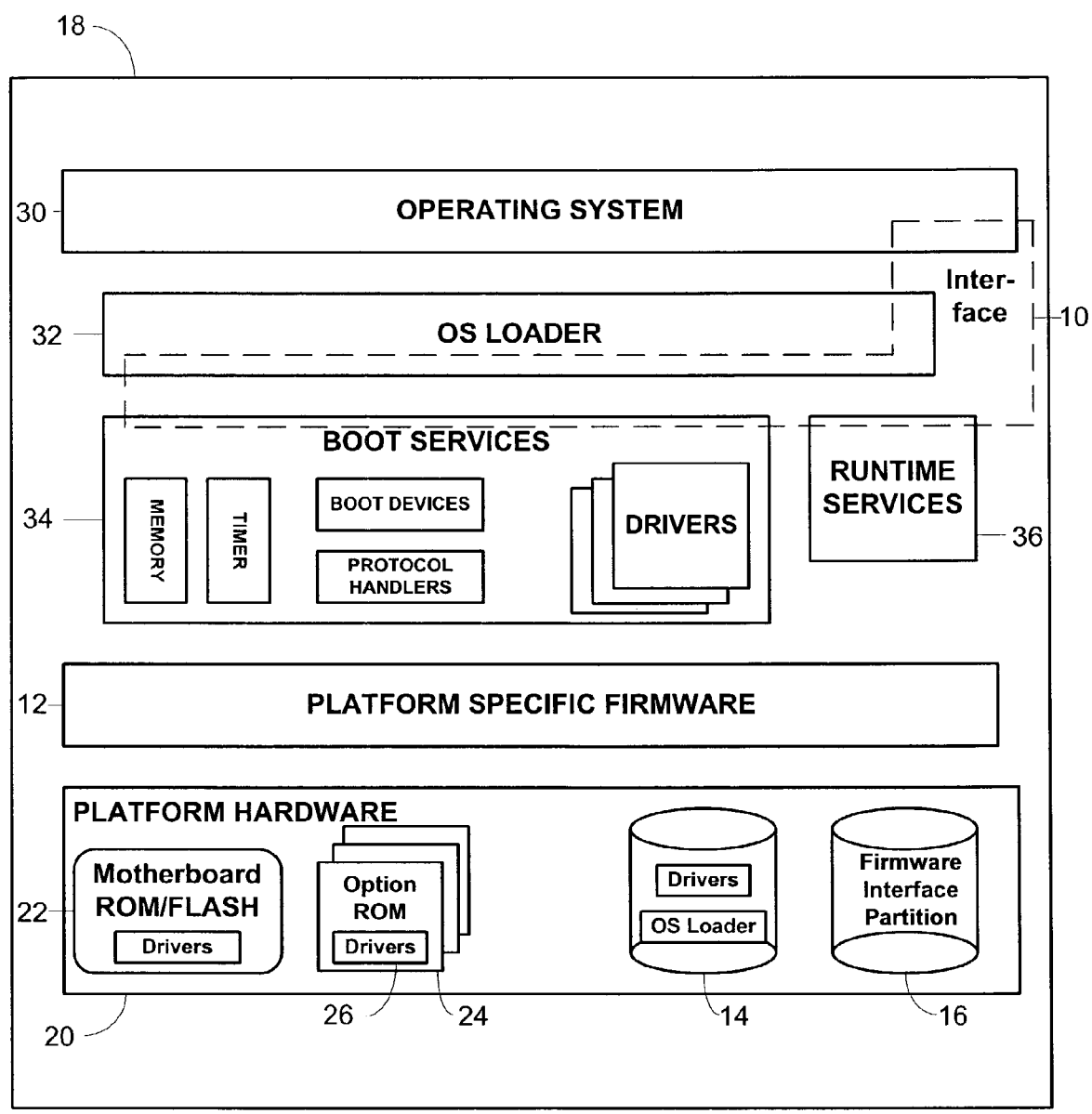
FIG. 1 illustrates some of the principal components of an embodiment of a firmware interface and their relationship to platform hardware and OS software.

FIG. 1 is a block diagram of several components of an embodiment of an interface 10 constructed in accordance with the teachings of the patent. This diagram illustrates the interactions of the various components accessed by the interface 10 to accomplish platform and OS boot. The platform firmware 12 is able to retrieve an OS loader image 14 from an interface system partition 16. The hardware and software components illustrated in FIG. 1 are some of the integral components of a computer/machine 18. It should be noted that for the purposes of this Description, the terms "computer" and "machine" are intended to be interchangeable.

The interface system partition 16 is one of several components included in the platform hardware 20. The platform hardware 20 includes several machine-accessible medium including a motherboard flash memory 22, a plurality of option Read Only Memories (ROMs) 24. The platform hardware also includes a plurality of drivers 26 that are modules of code typically inserted into the firmware via protocol interfaces. A protocol is akin to a C++ Class and is a collection of read-only data and a collection of callable interfaces. The interfaces are similar to C++ methods and are named by 16-byte unique identifiers, also known as Globally Unique Ids (GUIDs).

The drivers 26 are the control mechanisms for attached hardware devices and are typically embedded in the corresponding hardware option ROM 24 or flash memory 22. It should also be noted that interface drivers may provide device support during the boot process or they may provide platform services. In contrast, OS drivers are loaded to provide device support once the OS 30 takes control of the platform hardware 20.

A variety of mass storage devices including, for example, disk, compact disk (CD) drives and digital versatile disk (DVD) drives may be supported by the interface 10 to boot the OS 30. The OS 30 may also be remotely booted via a network. Persons of ordinary skill in the art will appreciate that other boot media types may be added to the platform hardware 20.

The interface 10 communicates with an OS loader 32. Once started, the OS loader 32 continues to boot the complete operating system 30. To do so, the OS loader 32 uses the interface boot services 34 and the interface 10 to survey, comprehend and initialize the various platform components and the OS software that manages them. Interface runtime services 36 are also available to the OS loader 32 during the boot phase. It should be noted that the interface 10 supports platform hardware architecture that has 32 and/or 64 bit instruction capabilities, as well as being easily adapted for use on other architectures.

The computer 18 of the instant example includes a few additional hardware components found in conventional computers, such as, for example, personal computers, laptops, notebooks, servers,, etc. The computer 18 may optionally include modifications to that conventional construction as explained in detail below. Thus, as shown in FIG. 2, the computer 18 includes a central processing unit 40 which is implemented, for example, by one or more Intel) microprocessors from the Pentium® family, the Itanium™ family, the XScale™ family or any other family of microprocessors.

In the illustrated example, the interface 10 is Intel's Extensible Firmware Interface (hereafter "EFI") which is an open extensible interface that lends itself to the creation of platform drivers. These drivers may be analogous to OS drivers, providing support for new device types during the boot process, or they may be used to implement enhanced platform capabilities such as fault tolerance or security. The EFI 10 helps developers avoid many of the frustrations inherent in trying to squeeze new code into a traditional Basic Input/Output System (hereafter "BIOS") environment. BIOS may be described in most instances as a collection of low-level service routines. As previously discussed, the EFI gives firmware developers an infrastructure to add capability to the platform in a modular way. The drivers may be implemented using high level coding languages because of the calling conventions and environment provided by the EFI. This in turn may help to reduce the difficulty and cost of innovation. The option of the Interface Partition 16 shown in FIG. 1 (which is a segment of a partition of, for example, a hard disk drive), provides an alternative to non-volatile memory storage for such extensions.

Figure 2:
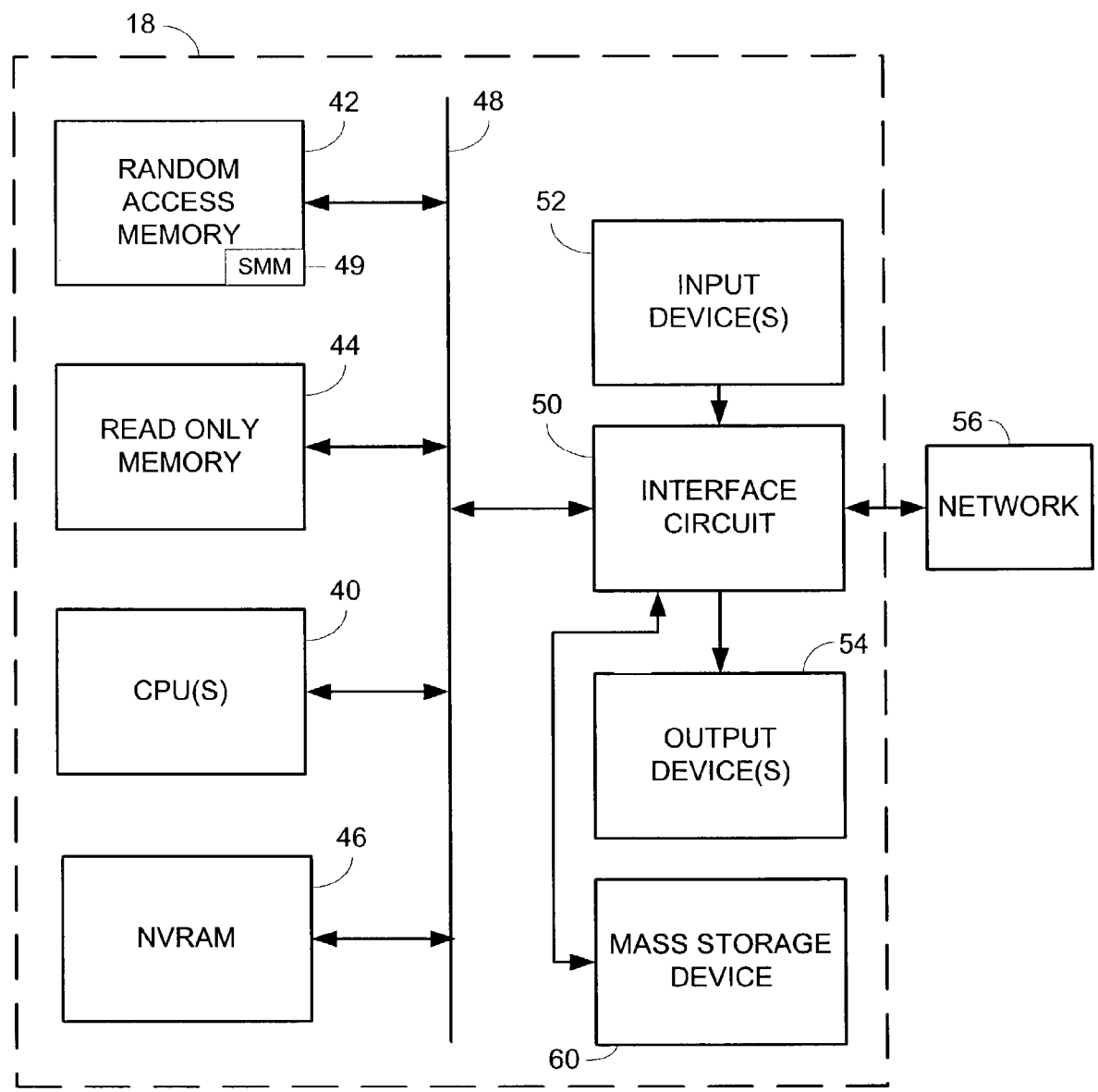
FIG. 2 is a block diagram of an exemplary computer utilizing the components of FIG. 1.

Referring to FIG. 2, as is conventional, the central processing unit 40 of the computer 18 is in communication with a number of machine-accessible medium including a volatile memory 42, a non-volatile memory 44, and a non-volatile random access memory (NVRAM) 46 via a bus 48. SDRAM, DRAM, RAMBUS or any other type of Random Access Memory (RAM) device may implement the volatile memory 42. The volatile memory 42 may include a protected memory area such as the System Management Mode (SMM) memory portion 49. The SMM 49 is a reserved location in the volatile memory 42 that is protected from being overwritten by a run-time operating system environment. Flash memory, option-ROMs, or any other desired type of memory device may implement the non-volatile memory 44. Access to the memory 42 is typically controlled by a memory controller (not shown) in a conventional manner.

The computer 18 also includes a conventional interface circuit 50. The interface circuit 50 may be implemented by any type of well known interface standard, such as an Ethernet interface, a universal serial bus (USB) and/or a third generation input/output (3GIO) interface (also known as PCI Express).

One or more input devices 52 generically referred to herein as hardware devices, are connected to the interface circuit 50. The input device(s) 52 permit a user to enter data and commands into the CPU 40. The input device(s) 52 can be implemented by, for example, a keyboard, a mouse, a touch screen, a track-pad, a trackball, isopoint and/or a voice recognition system.

One or more output devices 54, also generically referred to herein as hardware devices, are also connected to the interface circuit 50. The output devices 54 can be implemented, for example, by display devices, a printer and/or speakers. The interface circuit 50 would, thus, typically include a graphics driver card.

The interface circuit 50 may also include a communication device such as a modem or network interface card to facilitate exchange of data with external computers via a network 56 (e.g., an Ethernet connection, a digital subscriber line (DSL), a telephone line, coaxial cable, a cellular telephone system, etc.). Typically, the computer 18 also includes one or more mass storage devices 60 for storing software and data. Examples of such mass storage devices include floppy disk drives, hard drive disks, compact disk drives and DVD drives.

Figure 3:
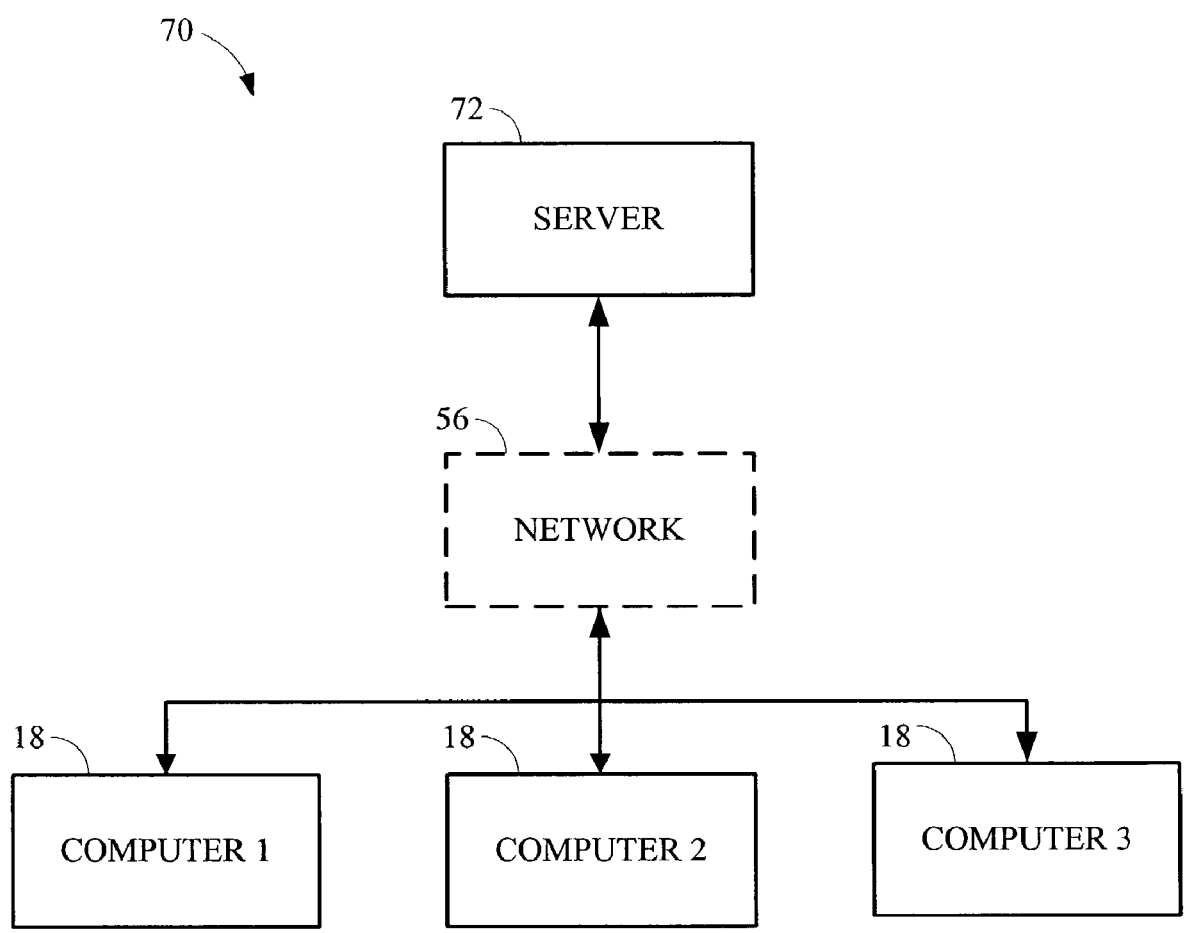
FIG. 3 is a block diagram of an embodiment of a system having a plurality of computers connected to a network.

A plurality of computers, such as the computer 18 shown in FIGS. 1 and 2, may be linked together to form a system of computers 70 as shown in FIG. 3. A server 72 may be a server computer of the type commonly employed in networking solutions, and linked to the computers 18 via the network 56. The server 72 may be used to install an initialization packet on each of the computers 18 as well as remotely performing a variety of additional tasks on the computers 18.

Although the network 56 is shown to include one server 72 and three computers 18, it should be understood that different numbers of computers and servers may be utilized. For example, the network 56 may include a plurality of servers 72 and thousands of computers 18 located in multiple physical locations, all of which may be interconnected via the network 56. According to the disclosed embodiment, this configuration may provide several advantages, such as, for example, enabling remote management and debugging capabilities by the remote server 72.

Figure 4:
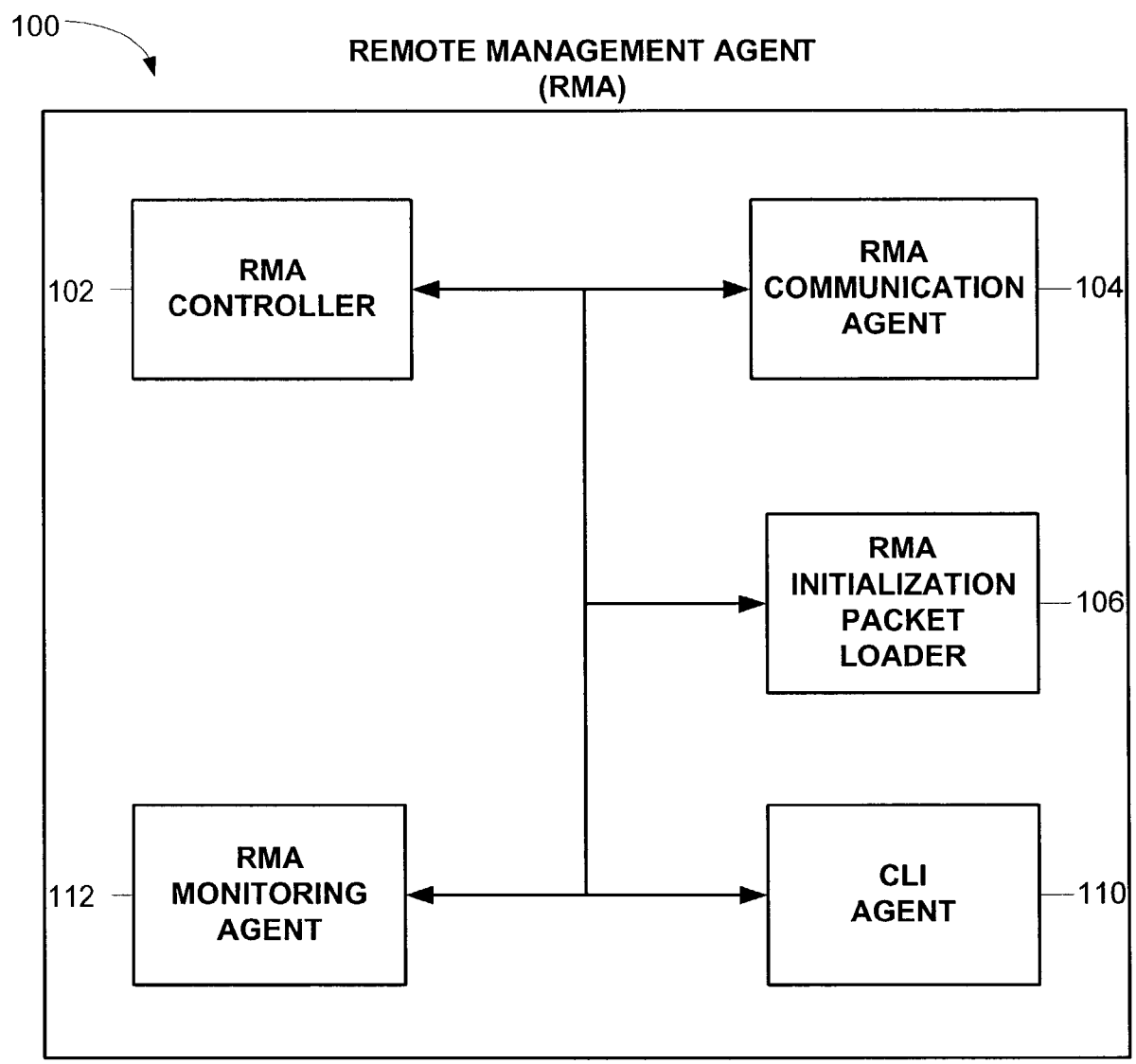
FIG. 4 is a schematic illustration showing an embodiment of a firmware interface configuration manager constructed in accordance with the teachings of the patent.

FIG. 4 illustrates schematically an embodiment of a remote management agent 100 to enable the remote management of the computer 18 shown in FIGS. 1-3, independent from the operating system 30. The remote management agent 100 provides the ability for the server 72 to remotely manage one or more computers 18 and includes a Remote Management Agent (RMA) controller 102 that communicates with an RMA communication agent 104 to provide a limited ability to communicate with remote computers via the network 56. The RMA controller 102 may cause the RMA communication agent 104 to send a broadcast message across the network 56 to seek a network identity. One or more servers 72 may respond to the broadcast and provide the computer 18 a network identity as well as an initialization packet.

An RMA initialization packet loader 106 receives the initialization packet from the server 72 and loads the packet in a protected memory area of the computer 18, such as, for example, the SMM 49 of the RAM 42. Included with the initialization packet is a Command Line Interface (CLI) agent 110 that includes specific information about the computer's 18 firmware. The CLI agent 110 is in communication with the RMA controller 102 and is used to perform a variety of tasks when appropriate instructions are received from the server 72.

The remote management agent 100 also includes an RMA monitoring agent 112 that is in communication with the RMA controller 102 to monitor for a communication from the server 72. Like the RMA communication agent 104, the RMA controller 102, the CLI agent 110, and the RMA monitoring agent 112 are capable of functioning in a pre-boot environment before an operating system is fully loaded. The RMA controller 102, the CLI agent 110, and the RMA monitoring agent 112 are also functional concurrently with a running OS. It should be noted that while the RMA controller 102, the CLI agent 110, and the RMA monitoring agent 112 may function concurrently with an OS, they function independent from the OS. The RMA controller 102, the CLI agent 110, and the RMA monitoring agent 112 are also capable of functioning even if the computer 18 is in a failed or unstable state.

As mentioned above, the RMA monitoring agent 112 monitors the computer 112 for a communication from the server 72. The CLI agent 110, working in conjunction with the RMA controller 102, interprets the communication and responds accordingly. The communication from the server may be instructions to perform any number of a variety of tasks. For example, the server 72 may instruct the remote management agent 100 to respond with data pertaining to the computer's OS 30, its platform hardware 20, its specific firmware 12, its interface 10, its resource utilization, its Field Replaceable Unit (FRU) data, the present state of the computer 18, etc.

The server 72 could also request a complete core dump from the computer 18. Another example is that the server may instruct the remote management agent 100 to perform a flash update, perform a hard drive image installation, initiate a configuration transaction, download an OS, etc. Each of these tasks is performed with the assistance of the RMA controller 102 and the CLI agent 110.

Figure 5A:
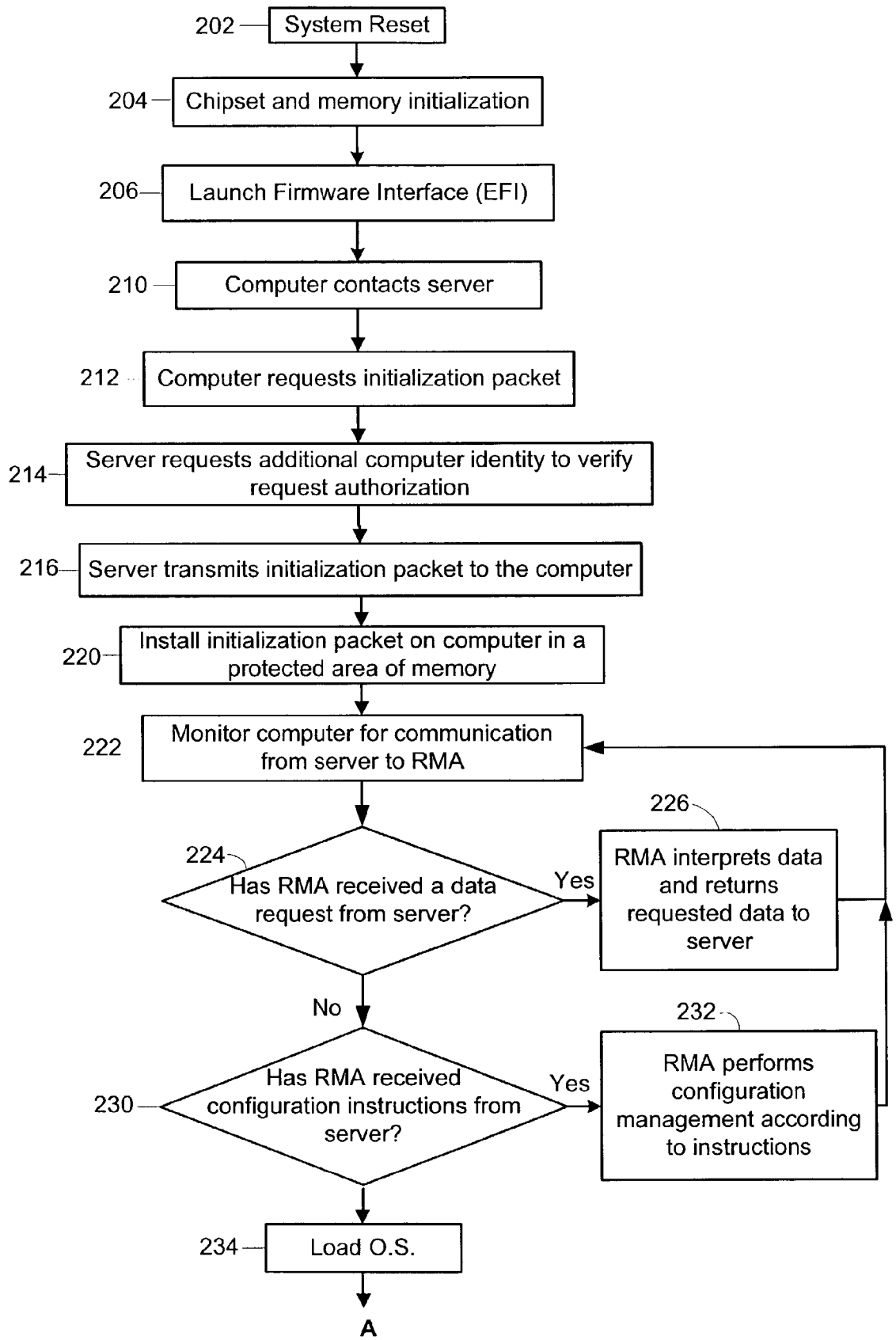
Figure 5B:
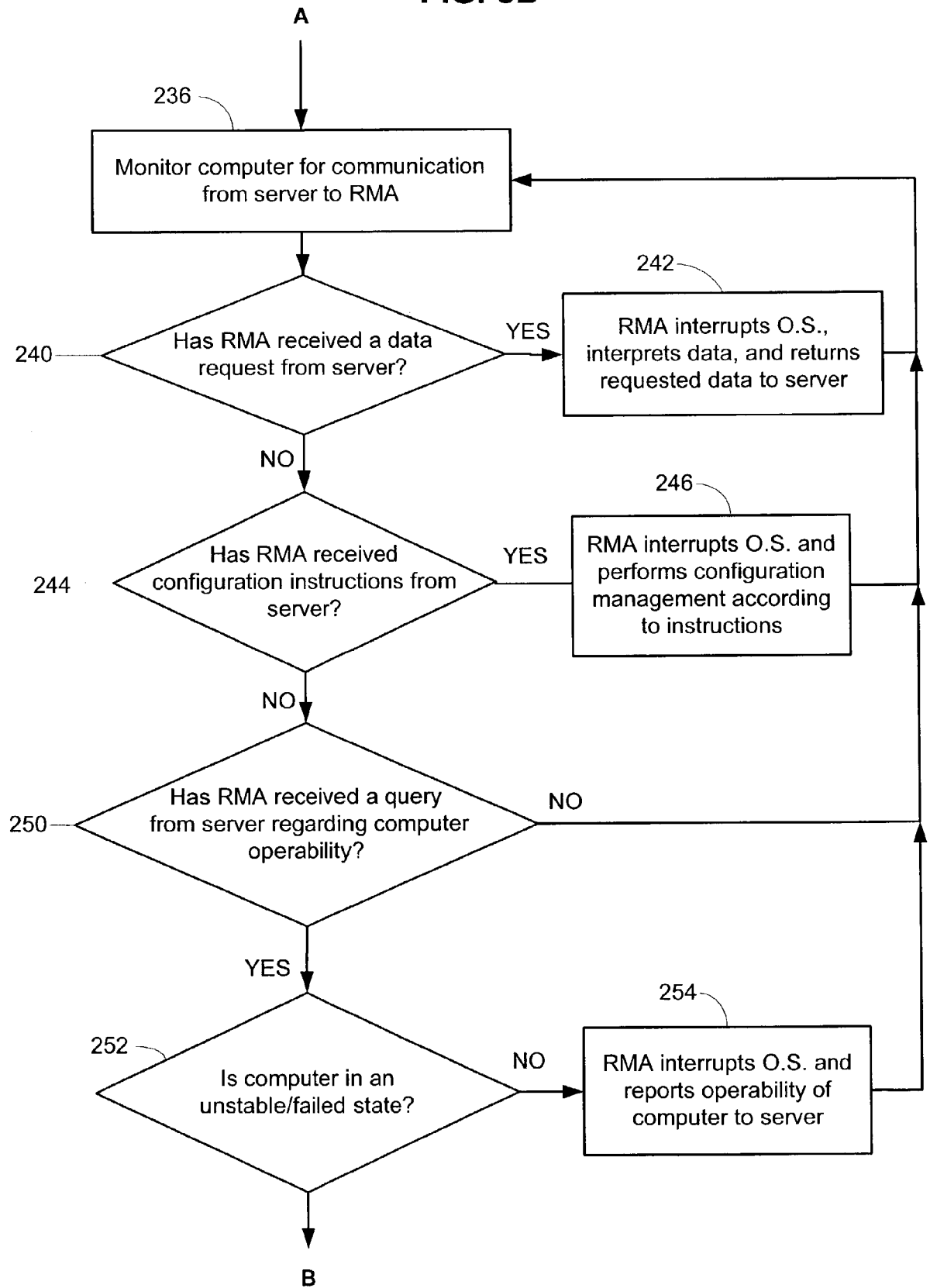

An embodiment of a software program for implementing the remote management agent 100 of FIG. 4 is shown in FIGS. 5A-C. In this embodiment, the program is for execution by the processor 40 and is embodied in software stored on a machine-accessible medium such as a CD-ROM, a floppy disk, a hard drive, a DVD, or a memory associated with the processor 40, but persons of ordinary skill in the art will readily appreciate that the entire program or parts thereof could alternatively be executed by a device other than the processor 40 and/or embodied in the firmware 12 or dedicated hardware in a well known manner.

For example, any or all of the RMA controller 102, the RMA communication agent 104, the RMA initialization packet loader 106, the CLI agent 1 10, and/or the RMA monitoring agent 112 could be implemented by software, hardware, and/or firmware. Further, although the example program is described with reference to the flowcharts illustrated in FIGS. 5A-C, persons of ordinary skill in the art will readily appreciate that many other methods of implementing the remote management agent 100 of FIG. 4 may alternatively be used. For example, the order of many of the blocks may be changed, and/or some of the blocks described may be changed, eliminated, or combined.

Referring to FIG. 5A, the flowchart 200 illustrates a program to provide for the remote management of the computer 18. After a system reset (block 202) where the computer 18 is reset or turned on for the first time, a chipset and memory initialization is performed (block 204). The chipset and memory initialization typically includes providing access to one or more industry standard data buses.

Once the initial chipset and memory initialization has been performed, the computer's firmware interface 10, such as EFI for example, may be launched (block 206). A portion of a remote management agent, such as the remote management agent 100 from FIG. 4 is also launched, to initiate a download of software to enable the dynamic remote management of the computer 18 from its pre-boot environment through its live run-time environment, independent from the OS 30. Once activated, the RMA communication agent 104 is programmed to initiate a communication over the network 56 (block 210). The communication may be a direct call to a specific server, such as the server 72. The communication could also be a broadcast message across the network 56 asking for a network identity.

One or more servers in the network may then respond to the communication agent 104 with a network identity. For example, in a typical business environment, this may entail a workstation initiating a handshake with an IT configured server. This communication includes a request to retrieve data from the server 72, wherein the requested data includes an initialization packet. The downloaded data and the initialization packet are described in more detail below.

Before transmitting the requested data to the RMA communication agent 104, the server 72 may check for security purposes with the computer 18 to verify the computer's identity (block 214). This verification could be accomplished by a simple request and verification of a 64 bit character of the computer 18. As another example, the verification could be performed by using public key/private key technology. Using this technique, the server 72 could request the computer's public key and check to see if a corresponding certificate has expired, and if not, the server 72 and computer 18 could exchange keys so that they can encrypt the transactions between the two. Those persons of ordinary skill in the art will appreciate that this identity verification of the computer 18 is optional.

The server 72 transmits the requested initialization packet (block 216) to the RMA communication agent 104 of the computer 18, where the RMA initialization packet loader 106 installs the initialization packet in a protected memory area of the computer 18 (block 220). For example, the protected memory area may be the SMM 49 of the RAM 42. The memory storage location of the initialization packet is not important, as long as the data is protected from being overwritten by the run-time OS 30. Included with the initialization packet is software to enable the CLI agent 110 and the RMA monitoring agent 112, as well as providing additional functionality for the RMA controller 102.

The CLI agent 110 includes a Command-Line Interface (CLI) software that is capable of running in a multitude of environments. An example of such an environment is shown in the embodiment illustrated in FIG. 1 which utilizes the firmware interface 10. The CLI agent 110 as well as the remote management agent 100 as a whole is also easily adaptable to run in environments that do not utilize a firmware interface. While the concept of the remote management agent is applicable in many environments, the remainder of the description corresponding to FIGS. 5A-C is directed to the embodiment disclosed in FIG. 1 which utilizes the firmware interface 10.

The RMA controller 102 and the CLI agent 110 have the ability to proxy commands from the server 72 such that they are able to interpret and respond to communications from the server 72 using firmware interface runtime calls to enable the retrieval of requested data. An example of an interaction request may be in the form of retrieving a specific set of ID/FRU data so that the server 72 is better able to identify the machine type it is communicating with. This type of data can be used by the server 72 to determine what the appropriate provisioning (configuration) images would be to transmit to the target.

It should be noted that when referring to the server 72 in this patent application, it is intended to be interpreted broadly to include both an actual person (i.e., administrator) communicating remotely with the computer 18 and automated software to communicate remotely and interact with the computer 18 without the presence of a person. Persons of ordinary skill in the art will also appreciate that a single server 72, whether a person or an automated script, can administer over the network 56 a plurality of computers 18.

The CLI agent 110 can be used to service many types of tasks and transactions such as remote flash updates and remote hard drive image installations. Furthermore, the RMA controller 102 and the CLI agent 110 can proxy data in such a way that remote programmatic transactions may be performed using the firmware interface infrastructure. This can be initiated by including with the initialization packet sent by the server 72 a specific packet containing a description of an interface, such as, for example, a Globally Unique IDentifier (GUID), along with the passed in parameters. This data can then be constructed by the CLI agent 110 and the RMA controller 102 to issue a firmware interface call to retrieve very specific pieces of system data. The RMA controller 102 would then cause the CLI agent 110 to respond to the communication from the server 72 with the output of the interface.

It should be noted that the components within the remote management agent 100 are functional independent from the OS 30. In other words, the remote management agent 100 remains functional regardless of the OS loaded on the computer 18 as well as in environments without an operating system and in environments where an operating system is unstable or has failed.

Referring again to FIG. 5A, when the initialization packet is installed on the computer 18, the RMA controller 102, the CLI agent 110 and the RMA monitoring agent 112 are fully enabled. The monitoring agent 112 then monitors the computer 18 for a communication from the server 72 (block 222). If the RMA monitoring agent 112 detects a communication from the server 72, the RMA controller 102 and CLI agent 110 determine if the communication is a data request from the server 72 (block 224). If it is determined that the communication was a request for data, the RMA controller 102 and the CLI agent 110 will interpret the data request and return the requested data to the server (block 226) and command the RMA monitoring agent 112 to continue monitoring the computer for another communication from the server 72 (block 222).

If the RMA controller 102 and the CLI agent 110 determine that the communication from the server 72 is one or more instructions or commands (block 230), the RMA controller 102 and CLI agent 110 will perform whatever task(s) they were instructed to perform (block 232), such as, for example, configuration management, and command the RMA monitoring agent 112 to continue monitoring the computer for another communication from the server 72 (block 222).

The operating system 30 is then loaded on the computer (block 234). The operating system 30 may be launched in a conventional manner from any memory, such as the mass storage device 60, or it may be downloaded from the server 72 via the network 56 as part of the configuration management performed in block 232. This would allow for new computers with very little software installed on them to be taken out of their boxes, plugged into the network 56, and have appropriate operating systems and other configuration data downloaded from the server 72 in a completely automated fashion. The server 72 could download different operating systems and configuration data to the computers based on their individual hardware/firmware that is communicated to the server 72 by the computers' RMA communication agents. It should also be noted that it is not necessary to load an operating system, and in such OS absent environments, the remote management agent 100 provides some limited management functionality for the computer 18 which is illustrated in blocks 222 through 232 and blocks 250 through 272.

Referring to FIG. 5B, if the OS 30 is loaded on the computer 18 from either a local or a remote location, the RMA monitoring agent 112 monitors the computer 18 for a communication from the server 72 during the OS's live run-time services (block 236). When the RMA monitoring agent 112 detects a communication from the server 72, or any other computer on the network 56, the RMA controller 102 and the CLI agent 110 determine if the communication was a data request from the server 72 (block 240). If the communication was a request for data, the RMA controller 102 will interrupt the OS 30, by for example, triggering a System Management Interrupt (SMI) to give control to the RMA controller 102 and the CLI agent 110 which interpret the data request and return the requested data to the server 72 (block 242). The RMA controller 102 then commands the RMA monitoring agent 112 to continue monitoring the computer 18 for another communication from the server 72 (block 236).

If the RMA controller 102 and the CLI agent 110 determine that the communication from the server 72 is not a data request, they may determine if the communication is an instruction to perform a task, such as modifying one or more configuration settings (block 244). If the communication is such an instruction, the RMA controller 102 interrupts the OS 30, by for example, triggering an SMI to give control to the RMA controller 102 and the CLI agent 110 which interpret the instructions from the server 72 and perform the configuration management or other task according to the instructions received from the server 72 (block 246). The RMA controller 102 then commands the RMA monitoring agent 112 to continue monitoring the computer 18 for another communication from the server 72 (block 236).

If the RMA controller 102 and the CLI agent 110 determine that the communication from the server 72 is not a data request or an instruction to perform a task, the components will determine if the communication is a query from the server 72 regarding the computer's status or operability (block 250). If the communication is not such an inquiry, the RMA controller 102 will then command the RMA monitoring agent 112 to continue monitoring the computer 18 for another communication from the server 72 (block 236).

If it is determined that the communication is such a status inquiry, the RMA controller 102 and the CLI agent 110 determine if the computer 18 is in an unstable or failed state (block 252). If the computer 18 is functioning normally and not in an unstable/failed state, the RMA controller 102 will interrupt the OS 30 by triggering an SMI to give control to the RMA controller 102 and the CLI agent 110 which report the normal operability to the server 72 (block 254). The RMA controller 102 then commands the RMA monitoring agent 112 to continue monitoring the computer 18 for another communication from the server 72 (block 236).

Referring to FIG. 5C, if it is determined that the computer 18 is in an unstable or failed state, the CLI agent 11 0 reports the instability/failure to the server 72 (block 256). Those of ordinary skill in the art will appreciate that other techniques for notifying the server 72 of an instability/failure are available, instead of periodically polling the computer 18 as described above. For example, a watchdog timer could be used, wherein the watchdog timer is periodically reset when the OS 30 is running and functioning properly. If the computer 18 becomes unstable or fails, the watchdog time would not be reset which would cause the RMA controller 102 to command the CLI agent 110 to notify the unstable/failed state to the server 72.

After receiving the report on the unstable/failed state from the computer 18, the server 72 responds to the report with a communication to the RMA monitoring agent 112. The RMA monitoring agent 112 communicates with the RMA controller 102 and the CLI agent 110 to interpret the communication and determine if the server 72 wants to triage the computer 18 (block 260).

If it is determined that the server 72 wants to triage the computer 18, the computer 18 is triaged, wherein the server 72 communicates with the underlying infrastructure to ascertain what caused the instability/failure of the computer 18 (block 262). The proxying of programmatic instructions allows for the remote user to interact with the system in such a way that obviates the need for a correctly functioning operating system to provide the requested data. Because the CLI agent 110 is stored in a protected area of memory, the CLI agent 110 is able to gain an acceptable level of insurance against the inability to interact with the system.

As part of the triage, the server 72 may request, for example, a core dump of memory, system resource state information, analysis of the current system register data, etc., to be sent from the computer 18 (block 264). The RMA controller 102 and the CLI agent 110 transfer the requested triage data to the server 72 to assist an administrator in ascertaining what caused the instability/failure/crash (block 266).

After triaging the computer 18, or after indicating that the server 72 did not want to triage the computer 18, the server 72 instructs the computer 18 to perform a reset in a communication to the remote management agent 100 (block 270). The RMA controller 102 and the CLI agent 110 then initiate a system reset of the computer 18 to restore operability and functionality to the computer 18 (block 272).

The modular nature of the firmware interface 10 allows for Operating System Vendor (OSV) personalization. Specifically, systems using a firmware interface, such as EFI, can have a module that understands how to parse Process Control Blocks (PCBs) and other operating specific information. This allows an administrator at the server 72 to be OS independent and obtain data rendered for a particular OS, such as Linux or Windows. Those persons of ordinary skill in the art will also understand that the debugging capabilities provided by the remote management agent 100 allows the triage infrastructure to be built into the computer's firmware, eliminating the need for debug equipment attached to the computer 18.

As described with relation to the foregoing example, the remote management agent 100 allows an OS and platform firmware (any software that is included in ROM) to communicate information necessary to support the OS boot process, thereby minimizing the investment of resources. The remote management agent 100 permits a standard shrink-wrap OS intended to run on a hardware platform to boot on a variety of system designs without additional platform or OS customization. This allows for platform innovation to introduce new features and functionality that enhance platform capability without requiring new code to be written in the OS boot sequence. In other words, the platform and OS are able to evolve and innovate independently of one another. Furthermore, the examples discussed above permit developers to design the interface so that it is compatible with a range of underlying hardware devices functions without having explicit knowledge of the specifics for each device in the range.

Although certain apparatus and methods implemented in accordance with the teachings of the patent have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of remotely managing a computer comprising:
    initiating a request from the computer to a server before loading an operating system on the computer, the request to obtain an initialization packet from the server, the initialization packet including software;
    communicating the initialization packet from the server to a remote management agent;
    installing the initialization packet in a protected memory area of the computer;
    protecting the installed initialization packet from being overwritten by the operating system;
    enabling an interface at the computer with the software, wherein the interface is functionally independent from the operating system of the computer;
    the interface detecting, interpreting, and responding to a communication from the server to the computer wherein the interface detects, interprets, and responds to the communication independently of the operating system and detects, interprets, and responds to the communication if the operating system is in one or more of a failed or unstable state; and
    configuring or triaging the computer using the response to the communication.

2. A method as defined in claim 1, further comprising interrupting the operating system when interpreting and responding to the communication from the server if the operating system is running on the computer.

3. A method as defined in claim 1, wherein initiating the request from the computer to the server, the request to obtain the initialization packet, communicating the initialization packet from the server to the remote management agent, and installing the initialization pack 4 in the protected memory area of the computer are performed before the operating system is fully launched.

4. A method as defined in claim 1, further comprising installing the initialization packet in a system management mode memory portion of a random access memory.

5. A method as defined in claim 1, further comprising launching an extensible firmware interface prior to installing the initialization packet.

6. A method as defined in claim 5, wherein retrieving and installing the initialization packet comprises retrieving and installing a command line interface software.

7. A method as defined in claim 6, wherein the interface detects, interprets, and responds to the communication from the server with the command line interface software using one or more runtime calls to the extensible firmware interface.

8. A method as defined in claim 1, wherein initiating the request and installing the initialization packet comprises retrieving and installing a description of an interface to allow the retrieval of a specific piece of data through an extensible firmware interface of the computer.

9. A method as defined in claim 8, wherein retrieving and installing the description of the interface comprises retrieving and installing a globally unique identifier.

10. A method as defined in claim 1, further comprising determining if the communication is a data request from the server or an instruction to perform a configuration management task on the computer.

11. A method as defined in claim 1, wherein responding to the communication comprises performing a task, wherein the task is selected from the group of tasks consisting of performing a flash update, performing a hard drive image installation, initiating a configuration transaction, monitoring a state of the computer, and obtaining a Field Replaceable Unit data corresponding to the computer.

12. A method as defined in claim 1, further comprising loading and activating the operating system prior to detecting the communication from the server.

13. A method as defined in claim 1, wherein responding to the communication from the server comprises sending a requested set of data to the server.

14. A method as defined in claim 1, further comprising determining if the computer is in an unstable or a failed state and reporting to the server whether the computer is in the unstable or the failed state, independent from the operating system.

15. A method as defined in claim 14, further comprising determining if the server wants to triage the computer if the computer is in the unstable or the failed state, independent from the operating system.

16. A method as defined in claim 15, further comprising sending the server a set of data if the server wants to triage the computer, independent from the operating system.

17. A method as defined in claim 14, further comprising receiving from the server instructions to reset the computer, and resetting the computer, independent from the operating system.

18. A method as defined in claim 1, further comprising requesting an identity of the computer to authorize a transfer of the initialization packet to the computer.

19. A method as defined in claim 1 wherein the interface interprets and responds to the communication from the server by initiating one or more runtime calls to an extensible firmware interface of the computer, independent from the operating system.

20. A method of remotely managing a computer comprising:
    launching an extensible firmware interface on the computer, the extensible firmware interface in communication with a remote management agent;
    launching the remote management agent on the computer, the remote management agent including a monitoring agent and a command line interface agent, wherein the remote management agent is functionally independent of an operating system of the computer and a proxy for communications and requests between a server and the computer;
    the remote management agent initiating the request from the computer to the server before the operating system of the computer is loaded, the request to obtain an initialization packet including software from the server;
    communicating the initialization packet from the server to the remote management agent;
    installing the initialization packet in a protected memory area of a random access memory associated with the computer;
    protecting the installed initialization packet from being overwritten by the operating system;
    enabling the monitoring agent and the command line interface agent with the software;
    at the monitoring agent, detecting the communication from the server to the computer, the communication including one or more of an interaction request, a configuration instruction, or a status request, wherein the monitoring agent is functionally independent from the operating system; and
    at the command line interface agent, responding to the communication from the server, a response to the communication including one or more of:
        communicating a response to the interaction request from the computer to the server, the response to the interaction request permitting the server to determine appropriate data to transmit to the computer in response to a subsequent configuration instruction,
        configuring the computer in response to the configuration instruction before booting the operating system on the computer,
        communicating the status from the computer to the server in response to the status request, and
        triaging the computer using the response to the communication if the operating system is in one or more of a failed or unstable state;
    wherein the command line interface agent and the monitoring agent function if the operating system is in one or more of a failed or unstable state.

21. A method as defined in claim 20, further comprising interrupting the operating system when responding to the communication from the server if the operating system is running on the computer.

22. A method as defined in claim 20, wherein initiating the request from the computer to a server, the request to obtain the initialization packet including software, communicating the initialization packet from the server to the remote management agent, and installing the initialization packet in the protected memory area of the random access memory is performed before an operating system is fully launched.

23. A method as defined in claim 20, further comprising installing the initialization packet in a system management mode memory portion of the random access memory.

24. A method as defined in claim 20, further comprising launching the extensible firmware interface prior to installing the initialization packet.

25. A method as defined in claim 20, wherein communicating and installing the initialization packet comprises communicating and installing a description of an interface to allow the retrieval of a specific piece of computer data.

26. A method as defined in claim 25, wherein communicating and installing the description of the interface comprises communicating and installing a globally unique identifier.

27. A method as defined in claim 20, further comprising determining if the communication is a data request from the server or an instruction to perform a configuration management task on the computer.

28. A method as defined in claim 20, wherein configuring the computer in response to the configuration instruction includes one or more of performing a flash update, performing a hard drive image installation, initiating a configuration transaction, monitoring a state of the computer, and obtaining a Field Replaceable Unit data corresponding to the computer.

29. A method as defined in claim 20, further comprising loading and activating the operating system prior to detecting the communication from the server.

30. A method as defined in claim 20, wherein communicating the response to the interaction request from the computer to the server comprises sending a requested set of data to the server.

31. A method as defined in claim 20, further comprising determining if the computer is in an unstable or a failed state and reporting to the server whether the computer is in the unstable or the failed state, independent from the operating system.

32. A method as defined in claim 31, further comprising determining if the server wants to triage the computer if the computer is in the unstable or the failed state, independent from the operating system.

33. A method as defined in claim 32, further comprising sending the server a set of data if the server wants to triage the computer, independent from the operating system.

34. A method as defined in claim 31, further comprising receiving from the server instructions to reset the computer, and resetting the computer, independent from the operating system.

35. A method as defined in claim 20, further comprising requesting an identity of the computer to authorize a transfer of the command line interface software to the computer.

36. A method as defined in claim 20 wherein the command line interface responds to the communication from the server by initiating one or more runtime calls to the extensible firmware interface of the computer, independent from the operating system.

37. A computer system having a processor for executing a software program and a memory for storing the software program, the processor being programmed to execute the software program to implement a remote management agent to remotely manage a computer, the software program comprising code for:
  utilizing an extensible firmware interface to abstracting an operating system of the computer from firmware of the computer, wherein the firmware is stored in a read-only memory of the computer, and wherein the firmware includes one or more of data and a function;
  contacting a server to obtain an initialization packet from the server before the operating system is loaded on the computer; and
  loading the initialization packet in a protected memory area of the computer, the initialization packet including code to enable a monitoring agent and a command line interface agent before the operating system is loaded;
  protecting the loaded initialization packet from being overwritten by the operating system;
  the monitoring agent monitoring the computer for a communication from the server, but wherein the monitoring is functionally independent of the operating system; and
  the command line interface agent interpreting and responding to the communication from the server independently of any BIOS commands by implementing a runtime call to the extensible firmware interface to one or more of retrieve the data from the firmware and implement the function of the firmware to configure or triage the computer if the operating system is in a failed or unstable state, wherein the command line interface agent is functionally independent of the operating system.

38. A computer system as defined in claim 37 wherein loading the initialization packet in a protected memory area of the computer includes instantiating an initialization packet loader to load the initialization packet in a system management mode memory portion of a random access memory.

39. A computer system as defined in claim 37 further comprising code for triggering a System Management Interrupt (SMI) for interrupting the operating system when the communication from the server is interpreted by the command line interface agent.

40. A computer system as defined in claim 37 further comprising code for assisting the command line interface agent to respond to the communication from the server.

41. A computer system as defined in claim 37 wherein the initialization packet comprises a globally unique identifier and further comprising code for the command line interface agent identifying and retrieving the data from the firmware by initiating a runtime call to the extensible firmware interface when responding to the communication from the server, the runtime call including the globally unique identifier.

42. A computer system as defined in claim 37 further comprising code for determining if the communication is a data request from the server or an instruction to perform a configuration management task on the computer.

43. A computer system as defined in claim 37, wherein the function is selected from the group of functions consisting of performing a flash update, performing a hard drive image installation, initiating a configuration transaction, monitoring a state of the computer, and obtaining a Field Replaceable Unit data corresponding to the computer.

44. A computer system as defined in claim 37 further comprising code for determining if the computer is in an unstable state or a failed state, independent from the operating system.

45. A computer system as defined in claim 37 further comprising code for the command line interface agent to triage the computer if the computer is in an unstable state or a failed state, independent from the operating system.

* * * * *

UNITED STATES PATENT AND TRADEMARK OFFICE
CERTIFICATE OF CORRECTION

PATENT NO. : 7,543,048 B2
APPLICATION NO. : 10/302281
DATED : June 2, 2009
INVENTOR(S) : Michael A. Rothman et al.

Page 1 of 1

It is certified that error appears in the above-identified patent and that said Letters Patent is hereby corrected as shown below:

At Column 13, line 10, "abstracting" should be -- abstract --.

Signed and Sealed this

Thirteenth Day of October, 2009

David J. Kappos
*Director of the United States Patent and Trademark Office*